Feb. 20, 1962  R. D. COOK ETAL  3,021,581
GROUND CLIP FOR ELECTRICAL OUTLET AND SWITCH BOXES
Filed Nov. 12, 1958

INVENTORS.
Raymond D. Cook
William A. Lang
BY
THEIR ATTORNEYS

United States Patent Office 3,021,581
Patented Feb. 20, 1962

3,021,581
GROUND CLIP FOR ELECTRICAL OUTLET
AND SWITCH BOXES
Raymond D. Cook and William A. Lang, Pittsburgh, Pa., assignors to Steel City Electric Company, Pittsburgh, Pa., a corporation of Pennsylvania
Filed Nov. 12, 1958, Ser. No. 773,326
4 Claims. (Cl. 24—73)

The present application relates to clips, more particularly to a ground clip for electrical outlet and switch boxes. This application is a continuation-in-part of Cook et al. application, Serial No. 682,420, filed September 6, 1957, and now abandoned.

A growing requirement of local building codes has been that switch and outlet boxes installed in homes or public buildings be grounded by connecting them to a ground wire which is built into conductor cables of the type now used for wiring homes. Heretofore, it has been the practice for electricians installing the boxes to wrap the ground wire with one or two twists around a screw used in holding the box together and then to tighten the screw. This practice is no longer permitted under many building codes because the screws are generally on the outside of the boxes and the ground connection cannot be inspected after the boxes have been plastered in.

One solution to the problem has been to make further use of the usual clamp screw provided inside the box in conventional way to hold down the built-in cable clamp at the point where the cable is led into the box. This screw is thus made to hold an additional twist or two of ground wire under its head but, as the insulating composition on the lead-in cable shrinks with age, the clamp gradually relaxes under the screw and the ground wire loosens and loses its effectiveness vital to good contact. Another solution is for the manufacturer to provide an extra screw inside the box to which the ground wire can be connected. This increases the cost of the box and considerable time is required to secure the ground wire to the screw.

The present clip which we provide forms a frictionally secured, quick attachment connection for clamping a straight length of bare ground wire directly to the inside wall of the switch box or outlet box to be grounded. The positively developed clamping pressure directed against the straight length of wire provides a solid ground connection path that is augmented to a certain extent by the metal of the clip itself which is in direct contact with both the bare wire and the box surface to be grounded. In tests, the connection between the wire and the box showed a voltage drop well below the standard prescribed by the Underwriters' Laboratories, i.e., 10 millivolts @ 30 amperes.

Preferably, this clip is made in one piece of spring steel bent into a U-shape, which is then cadmium, zinc, or otherwise plated, and thereafter heat treated to impart the proper degree of hardness and spring tension. The clip is placed over the top edge of a box and provided with a longitudinally extending corrugation such that, when forced into position with a special tool or with a pair of pliers as convenient, it holds a straight length of the wire under substantially evenly distributed line contact with the box.

The present clips can be made at very low price. They are quickly and easily installed and can be used on a variety of switch and outlet boxes. In cases where two or more ground wires are connected to one outlet box, it has been the past practice to twist the wires together, solder them, and then fasten one of the wires to a screw or bolt on the outlet box. Obviously, it is far simpler to use two of the clips according to our invention, one for each ground wire. This feature is particularly useful in cases where the wires are of different metals and have to be separated to prevent electrolytic deterioration.

We have shown a preferred embodiment of our invention in the accompanying drawing in which.

Figure 4:
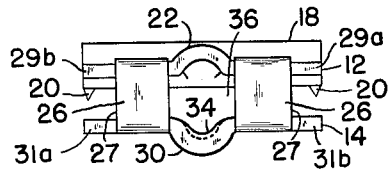
FIGURE 4 is a view in end elevation in the direction indicated by lines IV—IV of FIGURE 1.

More particularly, in FIGURES 1–5 of the drawings, we provide a one-piece clip 10 made of bent spring steel material of generally U shape and having a pair of legs 12 and 14, one for direct attachment to the wall of a device to be grounded. This attachment leg 12 has a transversely aligned pair of sheared edges 16 and is turned along a straight transverse bend line adjacent its unitary free end to form a reentrant-angled juncture with a ramp 18 and presenting thereat an inturned pair of sharp-cornered barbs 20. A conical corrugation 22 is pressed 1/32" outwardly from the plane of the top portion of the leg 12.

A pair of right angle bent spring arms 24 which lie parallel to one another have a substantially straight center section 26 and form an integral juncture between the legs 12 and 14. The spring arms 24 are relieved by notches 27 at their outer edges and are divided by a slot 28 punched equidistant therebetween; they rejoin at a point a short distance past their right angle bends where they merge with the corresponding attachment leg 12 and clamping leg 14 to form the mutually aligned tool shoulders indicated at 29a and 29b and at 31a and 31b respectively.

The clamping leg 14 is longitudinally corrugated with a corrugation 30 which forms a semicylindrical saddle bent on a curve (0.0325" inside radius) substantially conforming to the nominal radius of the wire to be clamped and disposed equidistant from the side edges of the leg 14. This corrugation 30 is pressed outwardly in transverse depth slightly more than one-half of the wire thickness and thus snugly rides the wire when the clip is installed to keep it squarely centered on a straight length of that wire. The inside surface of the corrugation is burred in at least one point to improve its positive electrical contact with the wire to be clamped, and a minor die blow preferably at the upper outer corner of the corrugation deflects the upper end portion of the latter at the right diagonal angle to produce the sharp-cornered burr 34 desired. The end of the cylindrical corrugation 30 aligns with the end of the conical corrugation 22 to form a pair of tool shoulders.

The side edges of the leg 14 are relieved at transversely aligned points with semicircular notches 31 through the margin and, at the free end, the leg 14 is formed with a trapezoidally-shaped center slot 32. This free end of the leg 14 is transversely turned to form a diagonally extending ram 33 bisected by the slot 32. The straight edges of the slot 32 form a guide extension to hold a captive length of wire from sliding sideways from under the corrugation 30, and the slot 28 at the other end of the corrugation 30 is in an aligned arrangement with the slot 32 and with the corrugations 22 and 30 and defines an opening 36 (end elevational view of FIGURE 4) for threading the wire.

Figure 6:
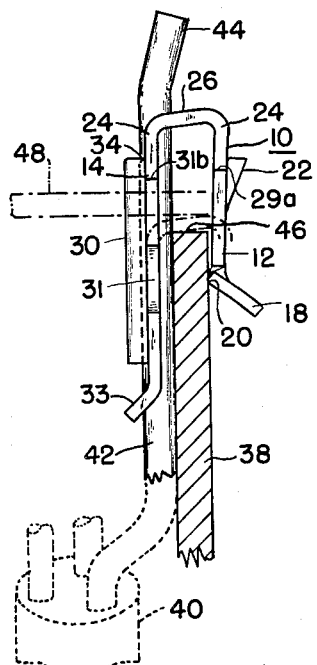
FIGURES 6 and 7 are side elevational and rear perspective views, respectively, during and following final assembly of one or more of the clips on an outlet box wall.
Figure 7:
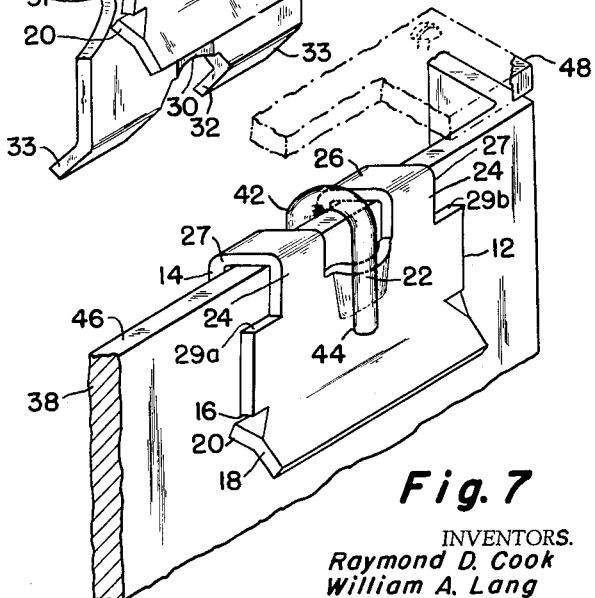

FIGURES 6 and 7 show a portion of the wall 38 of an outlet box or switch box provided with the usual lead-in opening and receiving a conventional electric cable 40 having multiple conductors comprising supply and ground-return circuit wires and including the bare length of a third or ground wire 42. In installation, the clip 10 is placed on the ground wire 42 with the free terminal 44 of the latter passing through the slot 32, between the corrugations 22 and 30, and through the opening 36 defined by the slot 28 (FIGURE 4); the wire is previously cropped off no closer than will allow the terminal portion 44 to extend ½" or more beyond the face of the box and the clip slides down the wire so as to be placed over an edge 46 of the box wall 38, as shown in FIGURE 6. With the wire 42 temporarily pressed against and parallel with the side 38 and normal to the edge 46, the clip 10 is gripped adjacent the abutments presented by opposed ones of the tool shoulders indicated and forced over the edge 46 with a pair of pliers or with a special tool until it is tight against that edge 46, as shown in FIGURE 7. The excess terminal 44 can be cut off but in practice is preferably bent around the edge of the box, and then a conventional finish plate or other cover member 48, as appropriate, can be secured across the open end of the box by fasteners in the desired way.

Following is an example of the dimensions of a clip 10 suitable for No. 14 or No. 16 solid copper wire:

| | | |
|---|---|---|
| Spring metal thickness of clip 10 | inches | 0.028 |
| Width of legs 12 and 14 | do | 15/32 |
| Overall length of clip | do | 39/64 |
| Distance which corrugation 30 is pressed outwardly | inches | 0.040 |
| Height of burr 34 | do | 0.008 |
| Diagonal angularity of ramps 18 and 33 | degrees | 45 |
| Normally spaced distance between legs 12 and 14 | inches | 0.050 |
| Nominal distance between leg 14 and points 20 | inches | 0.027 |
| Length of corrugation 30 | do | 13/32 |
| Length to diam. ratio, corrugation 30 | | 6.25:1 |
| Wire diameter | inches | 0.051–.064 |
| Box side 38, 14 gauge | inches thick | 0.078 |
| Gap between confronting portions 14 and 18 at widest point | inches | 0.115 |
| Zinc plate over spring steel | inches thick | 0.001 |

Figure 2:
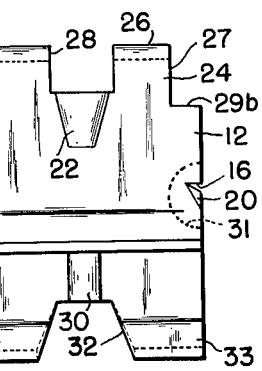
FIGURES 1, 2 and 3 are front, side, and rear views of a clip made according to our invention.
Figure 3:
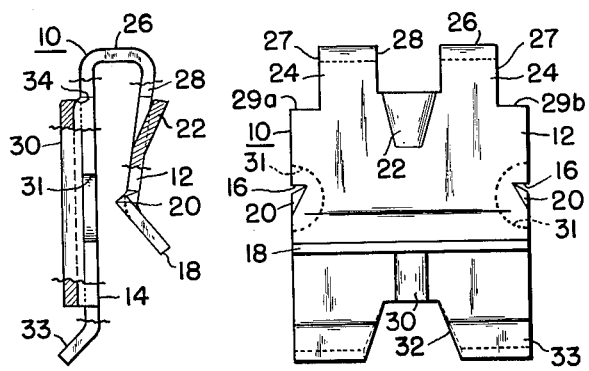
Figure 1:
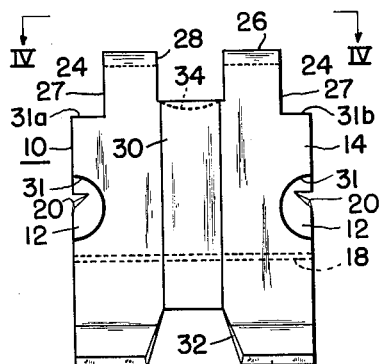
Figure 5:
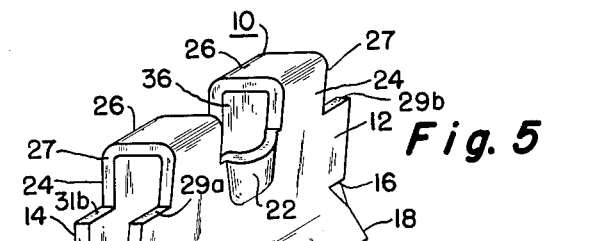
FIGURE 5 is a perspective view of the clip.

To enable the legs 12 and 14 in their free state to retain the specific attitude of FIGURE 2 requires that the spring arms 24 be initially over-bent somewhat at their right angle junctions such that, following the spring back natural with bent metal, the legs will take the desired angularity to the center section 26 and thereafter stay close together. For practical reasons during manufacture therefore, a strip of the flat spring metal stock must first, among other things, be relieved by notches 31 at proper points in the margin and also sheared at 16 and turned to provide the sharp points 20 which in their location occur substantially equal distances away from the center section 26 but in the opposite direction from the relieved points in developed view. Thereafter, when the strip is folded between its ends so as to form the bends adjacent its center section 26, the relieved points in the margin of the strip readily accommodate the sharp points 20, which, even though they protrude inwardly, are not confronted with a metal surface with which to register and become blunted. The extent to which the clip can be over-bent is thus materially increased and without danger of harming the points 20. Among other benefits due to the resulting closeness of the legs (0.050"), it has been found that the reentrant-angled or "knee" portion of the attachment leg 12 keeps each clip from nesting with others, i.e., becoming entangled in the gaps between their legs, when they are commingled for plating or bulk handling.

Inasmuch as the box wall 38 is thicker than the normally spaced distance between the legs 12 and 14 and inasmuch as the wire 42 is thicker than the distance to which the corrugation 30 is pressed outwardly, there is a substantial clamping pressure which develops directly at the interface of engagement between the wire and the wall. The barb points 20 digging into the opposite side of the wall of the box, due to the fact that they are laterally spaced relative to one another in a line parallel to the edge 46 of the latter, make it practicably impossible, without use of a tool, to remove the clip 10 after it has been forced into place. The pressure point exerted by the grip of the burr 34 against the wire 42 (FIGURE 6) is equally important and for an additional reason, i.e., as a means essential to reducing resistance to current flow at the resulting electrical joint grounding the box at its wall 38. As a consequence, the present interengaged joint shows a voltage drop well below the prescribed standard previously indicated, and the reverse-motion-preventing points 20 and burr 34 impart a character of permanence to that joint.

It is apparent that the outwardly spread ramps 18 and 33 facilitate the installation of the clip in spite of the natural spring action of the arms 24 and the legs 12 and 14. The length of the corrugation 30 measures several times the value of the inside diameter of the semicylindrical saddle which it forms and consequently there is a considerable length of straight wire involved running in bare contact from end to end of the saddle portion and necessarily at right angles to the wall edge 46. It is further apparent that, as against opposite sides of the flat wall 38, the line contact of the straight length of wire and the line of points 20 are in mutually perpendicular planes in a balanced geometrical arrangement whereby the intersection of the wire with a transverse plane through the latter line of points substantially bisects the straight wire portion between opposite ends of the corrugation 30 and extending from the burr point 34. At and beyond that point, the conical corrugation 22 and the opening 36 formed by the slot 28 at the corresponding end of the saddle take the attitude as shown in FIGURE 2 and can readily accommodate the extending length of terminal wire when inserted. If the wire is left untrimmed, the bent excess can stay lodged in the gap between the spring arms 24 as the portion 44.

While we have described certain presently preferred embodiments of our invention, it is to be understood that it may be otherwise embodied within the scope of the appended claims.

We claim:

1. A clip made of spring steel material being in a U shape and formed with plurality of transverse ramps at the end of the legs, said legs being mutually joined by a center section completing said U shape, sheared edges carried by one ramp on the legs and terminating in spaced corners for digging into the surface of a support, another ramp on one leg having a relieved mid-area to define a guide slot, said center section comprising a pair of spring arms divided by a conductor slot in said clip which for a substantial portion occupies said legs in spaced alignment with the relieved mid-area, said conductor slot bisecting said center section, there being a corrugation pressed outwardly in said one leg in the space extending between said relieved mid-area and said conductor slot, the aforesaid slots in said clip complementing one another as viewed in end elevation to define a wire aperture for insertion of a captive length of wire retained in alignment therebetween and in confinement within said corrugation and between said spring arms, said corrugation having a length dimension at least approximately six times the diameter of said wire aperture.

2. A clip made of spring steel material being in a U shape and formed with a plurality of transverse ramps at the end of the legs, said legs being mutually joined by a center section completing said U shape, sheared edges carried by one ramp on the legs and terminating in spaced corners for digging into the surface of a support, another ramp on one leg having a relieved mid-area to define a guide slot, said center section comprising a pair of spring arms divided by a conductor slot in said clip which for a substantial portion occupies said legs in spaced alignment with the relieved mid-area, said center section being narrower than said legs whereby the legs of the clip define laterally spaced apart, mutually aligned tool shoulders at their junction with the spring arms of said center section, said conductor slot bisecting said center section, there being a corrugation pressed outwardly in said one leg in the space extending between said relieved mid-area and said conductor slot, the aforesaid slots in said clip complementing one another as viewed in end elevation to define a wire aperture for insertion of a captive length of wire retained in alignment therebetween and in confinement within said corrugation and between said spring arms, said corrugation having a length dimension at least approximately six times the diameter of said wire aperture.

3. A one-piece clip of spring metal bent in a U-shape and formed with a plurality of transverse ramps at the end of the legs, sheared edges carried by the ramp on one leg and terminating in sharp corners for digging into the surface of a plate adjacent one edge of the latter, there being a conductor groove provided in another ramp-carrying leg so as to form in the surface of the leg a passage for a conductor lying between the wall of said groove and the surface of the plate holding the clip, there being a conductor slot which is formed in said clip and which for a portion occupies said other leg, said conductor groove extending between the ramp carried by said other leg and said conductor slot, and being aligned with the latter whereby the midplane of the slot substantially bisects the groove.

4. A one-piece clip of spring metal bent in a U-shape and formed with a plurality of transverse ramps at the ends of the legs, sheared edges carried by the ramp on one leg and terminating in sharp corners for digging into the surface of a plate adjacent one edge of the latter, there being a groove provided in another ramp-carrying leg so as to form in the surface of the leg a passage for a conductor lying between the wall of said grove and the surface of the plate holding the clip, there being a slot which is formed in said clip and which for a portion occupies said other leg, said groove extending between the ramp carried by said other leg and said slot, and being aligned with the latter whereby the midplane of the slot substantially bisects the groove, there being a slot formed in the ramp in said other leg at a point in said plane of the first said slot so as to render the mouth of said groove unobstructed.

References Cited in the file of this patent

UNITED STATES PATENTS

| | | |
|---|---|---|
| 516,291 | Aylworth et al. | Mar. 13, 1894 |
| 2,244,427 | Miller | June 3, 1941 |
| 2,652,620 | Sutowski | Sept. 22, 1953 |
| 2,684,994 | Kwake | July 27, 1954 |
| 2,710,381 | Monson | June 7, 1955 |
| 2,768,232 | Kwake | Oct. 23, 1956 |
| 2,805,402 | Lucal | Sept. 3, 1957 |
| 2,871,547 | Huggins | Feb. 3, 1959 |
| 2,871,549 | Arnold | Feb. 3, 1959 |
| 2,879,570 | Becker | Mar. 31, 1959 |
| 2,881,493 | Cochran | Apr. 14, 1959 |
| 2,918,712 | Fernberg | Dec. 29, 1959 |

FOREIGN PATENTS

| | | |
|---|---|---|
| 686,238 | Great Britain | Jan. 21, 1953 |